United States Patent
Heckmeier et al.

(10) Patent No.: US 6,761,938 B2
(45) Date of Patent: Jul. 13, 2004

(54) ELECTRO-OPTICAL LIQUID-CRYSTAL DISPLAY AND LIQUID-CRYSTAL MEDIUM

(75) Inventors: Michael Heckmeier, Bensheim (DE); Marcus Reuter, Darmstadt (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 50 days.

(21) Appl. No.: 09/836,860

(22) Filed: Apr. 18, 2001

(65) Prior Publication Data
US 2003/0224125 A1 Dec. 4, 2003

(30) Foreign Application Priority Data
Apr. 18, 2000 (DE) .......................... 100 19 061

(51) Int. Cl.$^7$ .................. C09K 19/20; C09K 19/30; C09K 19/34
(52) U.S. Cl. .............. 428/1.1; 252/299.63; 252/299.66; 252/299.67; 252/299.61
(58) Field of Search ................ 252/299.67, 299.61, 252/299.63, 299.66; 428/1.1

(56) References Cited

U.S. PATENT DOCUMENTS

| | | | | |
|---|---|---|---|---|
| 4,143,947 A | * | 3/1979 | Aftergut et al. | 252/299.01 |
| 5,156,763 A | * | 10/1992 | Gray et al. | 252/299.67 |
| 5,334,327 A | * | 8/1994 | Gray et al. | 252/299.67 |
| 6,287,646 B1 | * | 9/2001 | Takeuchi et al. | 428/1.1 |
| 6,348,244 B1 | * | 2/2002 | Miyazawa et al. | 428/1.1 |
| 6,500,502 B1 | * | 12/2002 | Fujita et al. | 428/1.1 |
| 6,562,421 B2 | * | 5/2003 | Sudo et al. | 428/1.1 |

FOREIGN PATENT DOCUMENTS

| | | | |
|---|---|---|---|
| EP | 0 588 568 A2 | | 3/1994 |
| EP | 919536 | * | 6/1999 |
| JP | 09-157654 | * | 6/1997 |
| JP | 11-158138 | * | 6/1999 |
| WO | WO 91/10936 | | 7/1991 |

OTHER PUBLICATIONS

English translation for JP 11–158138 by computer http://www6.ipdl.jpo.go.jp/Tokujitu/PAJdetail.ipdl?N0000=60&N0120=01&N2001=2&N3001=H11–158138.*

English translation for JP 09–157654 by computer, http://www6.ipdl.jpo.go.jp/Tokujitu/PAJdetail.ipdl?N0000=60&N0120=01&N2001=2&N3001=H09–157654.*

* cited by examiner

*Primary Examiner*—Shean C. Wu
(74) *Attorney, Agent, or Firm*—Millen, White, Zelano, Branogan, P.C.

(57) ABSTRACT

A liquid-crystalline medium of positive dielectric anisotropy suitable for use in an electro-optical liquid-crystal display having a realignment layer, for realigning the liquid crystals, whose field has a component parallel to the liquid-crystal layer which is crucial for the realignment, comprises at least one mesogenic compound and at least one compound of the formula I

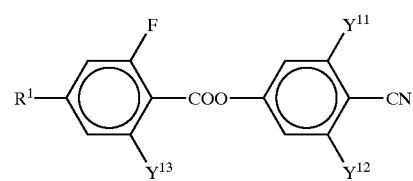

in which the substituents are as defined herein.

38 Claims, No Drawings

ELECTRO-OPTICAL LIQUID-CRYSTAL DISPLAY AND LIQUID-CRYSTAL MEDIUM

The invention relates to an electro-optical liquid-crystal display having a realignment layer, for realigning the liquid crystals, whose field has a component parallel to the liquid-crystal layer which is crucial for the realignment, containing a liquid-crystalline medium of positive dielectric anisotropy, where the medium comprises at least one mesogenic compound of the formula I

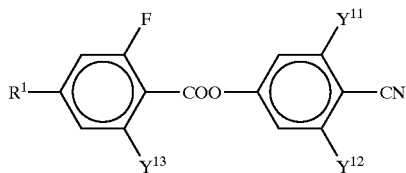

wherein $R^1$ is H, alkyl or alkoxy having 1 to 7 carbon atoms or alkenyl, alkenyloxy or alkoxyalkyl having 2 to 7 carbon atoms, and $Y^{11}$, $Y^{12}$ and $Y^{13}$ are each, independently of one another, H or F.

In conventional liquid-crystal displays (TN, STN, OMI AMD-TN), the electric fields for the realignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operation of a display of this type are described, for example, by R. A. Soref in Journal of Applied Physics, Vol. 45, No. 12, pp. 5466–5468 (1974).

For example, EP 0 588 568 discloses various possibilities for designing the electrodes and for addressing a display of this type. DE 198 24 137 likewise describes various embodiments of IPS displays of this type.

Liquid-crystalline materials for use in IPS displays of this type are described, for example, in DE 198 48 181.

IPS displays containing the known liquid-crystalline media are characterized by inadequately long response times and often by excessively high operating voltages. There is thus a need for IPS displays which do not have these disadvantages, or only do so to a reduced extent. Liquid-crystalline materials required for this purpose are in particular those which, in addition to an adequate phase range, a low crystallization tendency at low temperatures, a low birefringence and an adequate electrical resistance, in particular have low threshold voltages ($V_{10}$) and low rotational viiscosities ($\gamma_1$) which are crucial for the response times.

Surprisingly, this object has been achieved by using liquid-crystalline materials which comprise at least one compound of the formula I.

Upon further study of the specification and appended claims, further objects and advantages of this invention will become apparent to those skilled in the art.

The IPS mixtures according to the invention are notable for their relatively high clearing points, their low rotational viscosities and their low thresholds.

The invention thus relates to an electro-optical liquid-crystal display having a realignment layer, for realigning the liquid crystals, whose field has a significant component parallel to the liquid-crystal layer, containing a liquid-crystalline medium of positive dielectric anisotropy, where the medium comprises at least one compound of the formula I

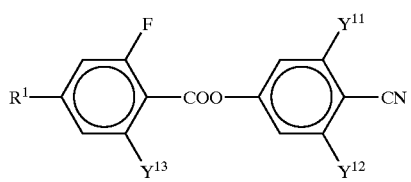

in which $R^1$ is alkyl or alkoxy having 1 to 7 carbon atoms, preferably n-alkyl or n-alkoxy, particularly preferably having 1 to 5 carbon atoms, or alkenyl, alkenyloxy or alkoxyalkyl having 2 to 7 carbon atoms, preferably 1E-alkenyl, 1E-alkenyloxy or straight-chain alkoxylalkyl, particularly preferably having 2 to 5 carbon atoms and $Y^{11}$, $Y^{12}$ and $Y^{13}$ are each, independently of one another, H or F.

Particular preference is given to liquid-crystal displays containing a liquid-crystal medium which comprises at least one compound of the formula I in which at least one of the radicals $Y^{11}$ to $Y^{13}$ is F. Very particular preference is given to such liquid-crystal displays containing a liquid-crystal medium which comprises at least one compound of the formula I in which at least one of the radicals $Y^{11}$ and $Y^{12}$ is F.

The liquid-crystal displays preferably contain liquid-crystal media which comprise at least one compound selected from the group consisting of the compounds of the formulae Ia to If

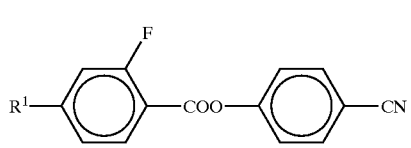

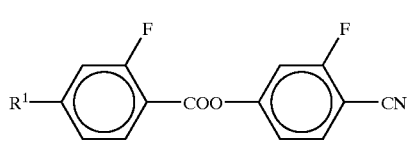

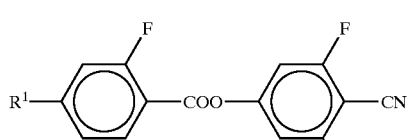

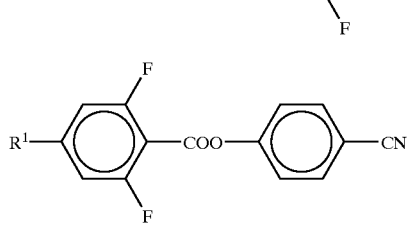

-continued

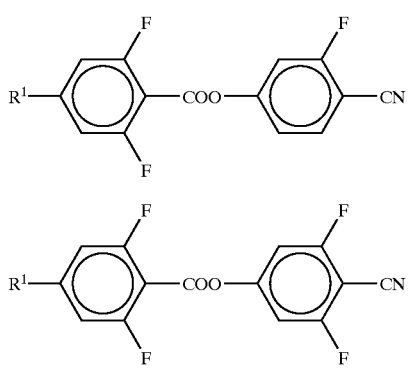

Particular preference is given to compounds selected from the group consisting of the compounds of the subformulae Ic, Ie and If, very particularly preferably of the subformulae Ic and If.

Preference is furthermore given to liquid-crystal displays containing a liquid-crystalline medium which comprises one or more compound(s) of the formula II

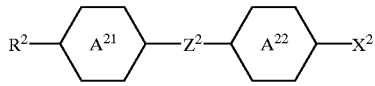

II in which

R$^2$ is alkyl or alkoxy having 1 to 7 carbon atoms or alkenyl, alkenyloxy or alkoxyalkyl having 2 to 7 carbon atoms,

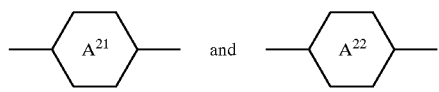

are each, independently of one another,

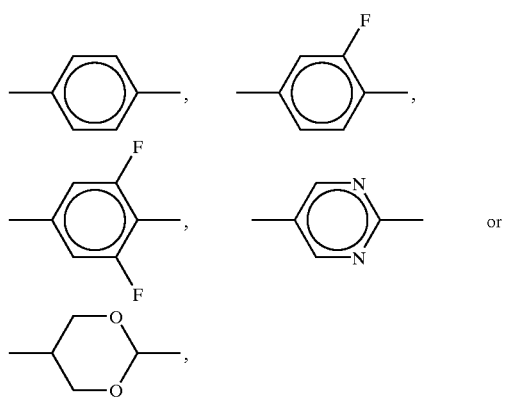

X$^2$ is F, Cl, CN or NCS, and
Z$^2$ is CH$_2$CH$_2$, COO, CF$_2$O or a single bond,
with the proviso that compounds of the formula I are excluded.

Particular preference is given to compounds of the formula II in which

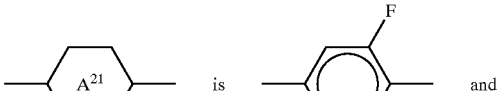

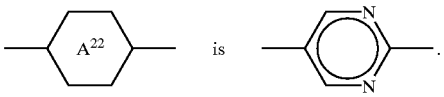

Preference is furthermore given to compounds of the formula II in which

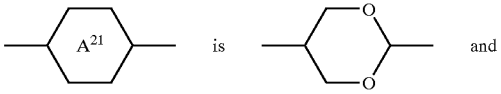

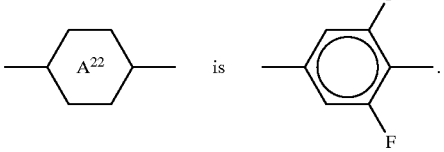

Preference is furthermore given to compounds of the formula II in which X$^2$ is CN.

Preference is furthermore given to liquid-crystal displays in which the liquid-crystalline medium comprises one or more compound(s) of the formula III

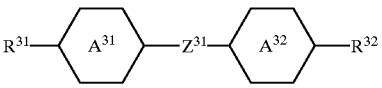

III in which

R$^{31}$ and R$^{32}$ are each, independently of one another, alkyl or alkoxy having 1 to 7 carbon atoms or alkenyl, alkenyloxy or alkoxyalkyl having 2 to 7 carbon atoms,

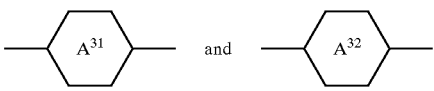

are each, independently of one another,

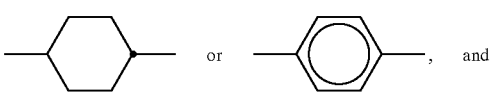

Z$^{31}$ is CH=CH, COO, CH$_2$CH$_2$ or a single bond.

Particular preference is given to compounds of the formula III in which at least one of the radicals R$^{31}$ and R$^{32}$ is alkenyl having 2 to 7 carbon atoms, preferably 2 or 3 carbon atoms.

Preference is furthermore given to compounds of the formula III in which Z$^{31}$ is CH=CH or a single bond.

Preference is furthermore given to compounds of the formula III in which at least one of

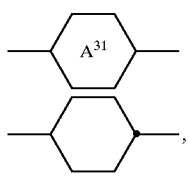 and 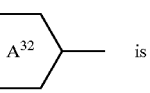 is

, particularly preferably both are

 .

Preference is furthermore given to liquid-crystal displays in which the liquid-crystalline medium comprises one or more compounds of the formula IV

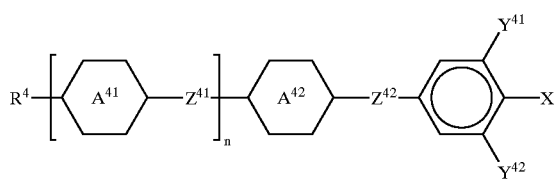

IV in which
R$^4$ is alkyl or alkoxy having 1 to 7 carbon atoms or alkenyl, alkenyloxy or alkoxyalkyl having 2 to 7 carbon atoms,

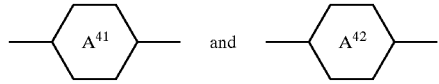

and are each, independently of one another,

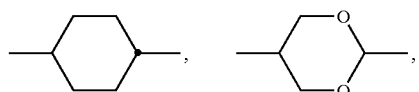

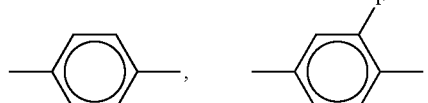

or

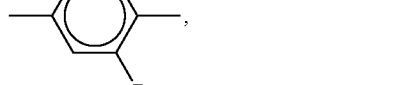

,

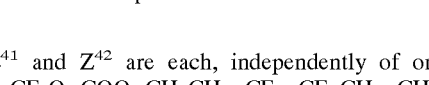

Z$^{41}$ and Z$^{42}$ are each, independently of one another, CF$_2$O, COO, CH$_2$CH$_2$, CF=CF, CH=CH, CF=CH, CH=CF or a single bond,
n is 0 or 1,
X is OCF$_3$, OCF$_2$H or F,
and
Y$^{41}$ and Y$^{42}$ are each, independently of one another, H or F.

Particular preference is given to compounds of the formula IV in which at least one of

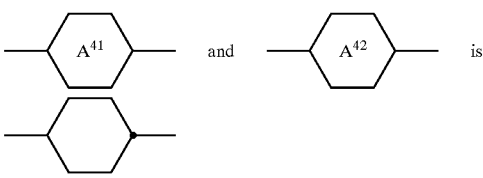 and 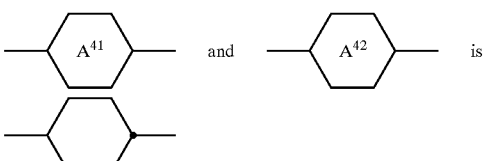 is

Preference is furthermore given to compounds of the formula IV in which Z$^{41}$ and Z$^{42}$ are each, independently of one another, CH$_2$CH$_2$ or a single bond.

Preference is furthermore given to compounds of the formula IV in which X is OCF$_3$ and Y$^{41}$ and Y$^{42}$ are H, and to compounds of the formula IV in which X is F and Y$^{41}$ and Y$^{42}$ are F.

Particular preference is given to media which comprise at least one compound of the formula I and at least one compound of the formula II.

Particular preference is given to liquid-crystal displays in which the liquid-crystalline medium comprises one or more compound(s) of the formula II selected from the group consisting of the subformulae IIa to IIe.

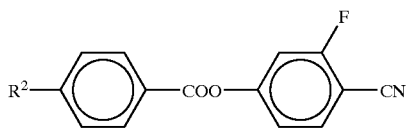

IIa

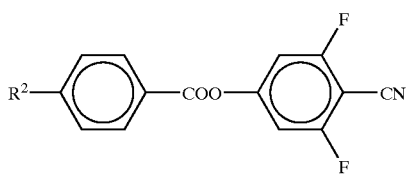

IIb

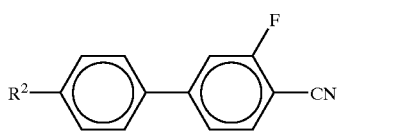

IIc

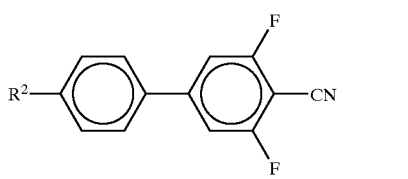

IId

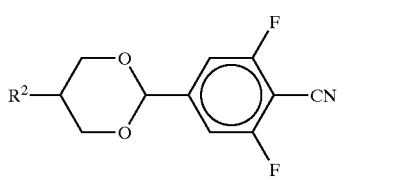

IIe

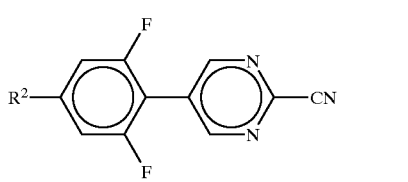

IIf

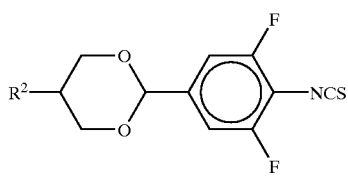

in which $R^2$ is as defined above under formula II.

The liquid-crystal display particularly preferably contains a liquid-crystalline medium comprising one or more compound(s) selected from the group consisting of compounds of the subformulae IIa, IIc, IId, IIe and IIf, in particular IIe and IIf.

Preference is furthermore given to liquid-crystal displays in which the liquid-crystalline medium comprises one or more compound(s) of the formula III selected from the group consisting of the subformulae IIIa to IIIc.

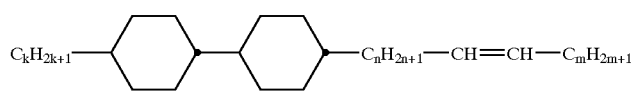

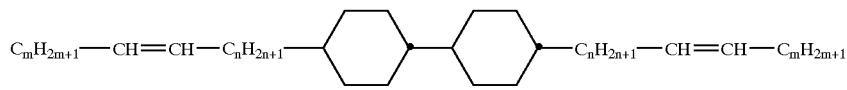

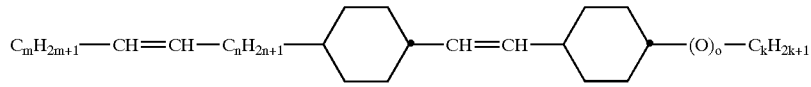

where k is 1, 2, 3, 4 or 5, m and n are each, independently of one another, 0, 1, 2 or 3, and m+n≦5, and o is 0 or 1.

Preference is furthermore given to liquid-crystal displays in which the liquid-crystalline medium comprises one or more compound(s) of the formula IV selected from the group consisting of the subformulae IVa to IVo.

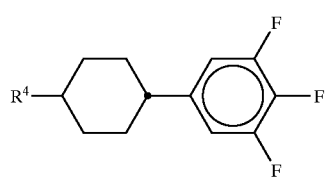

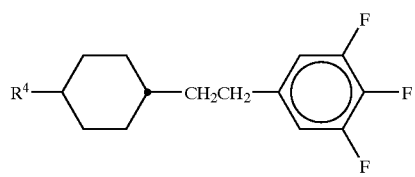

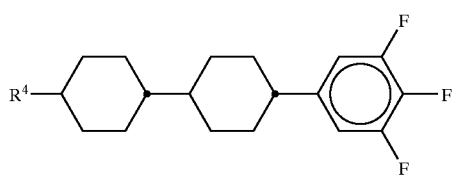

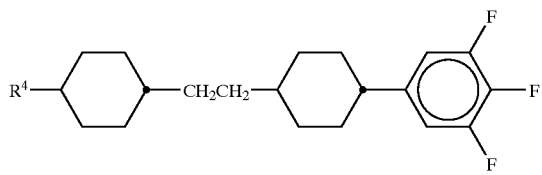

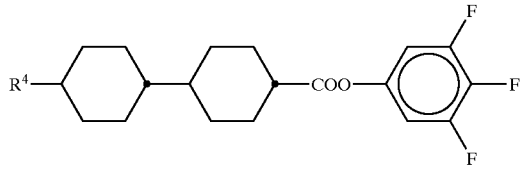

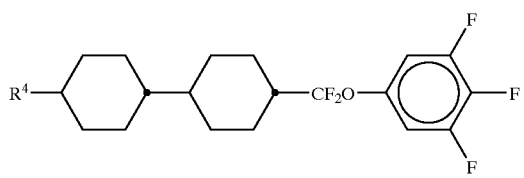

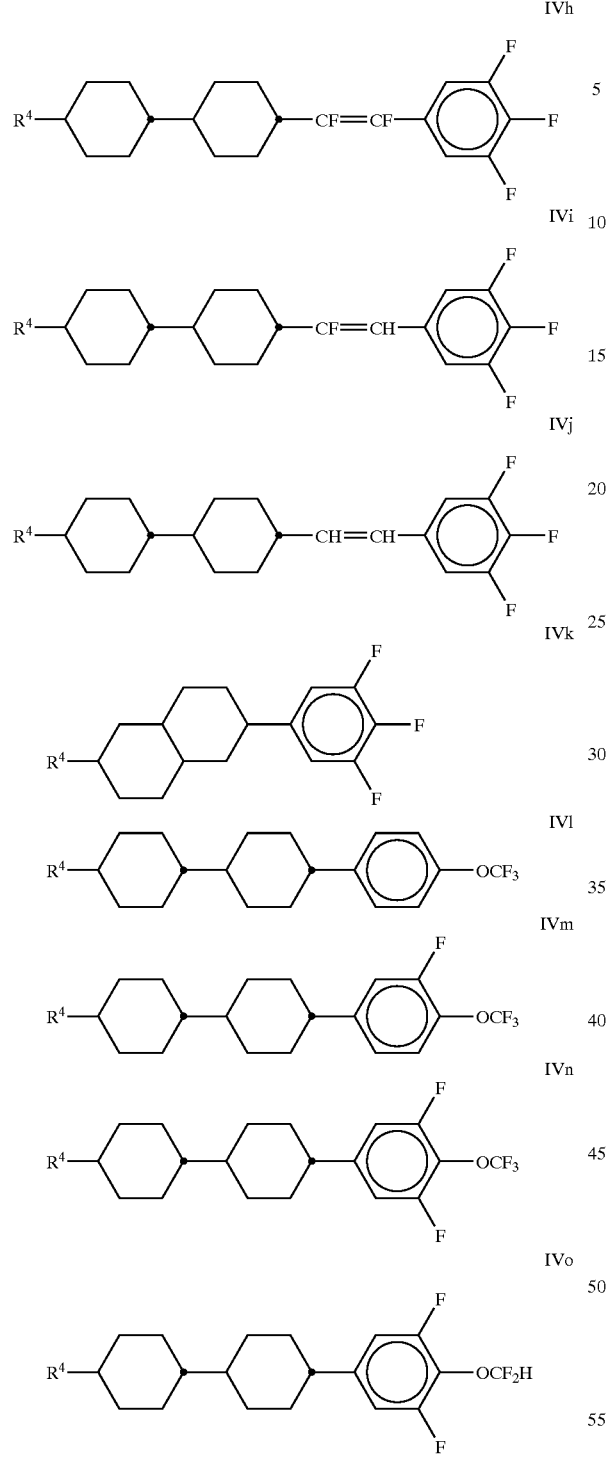
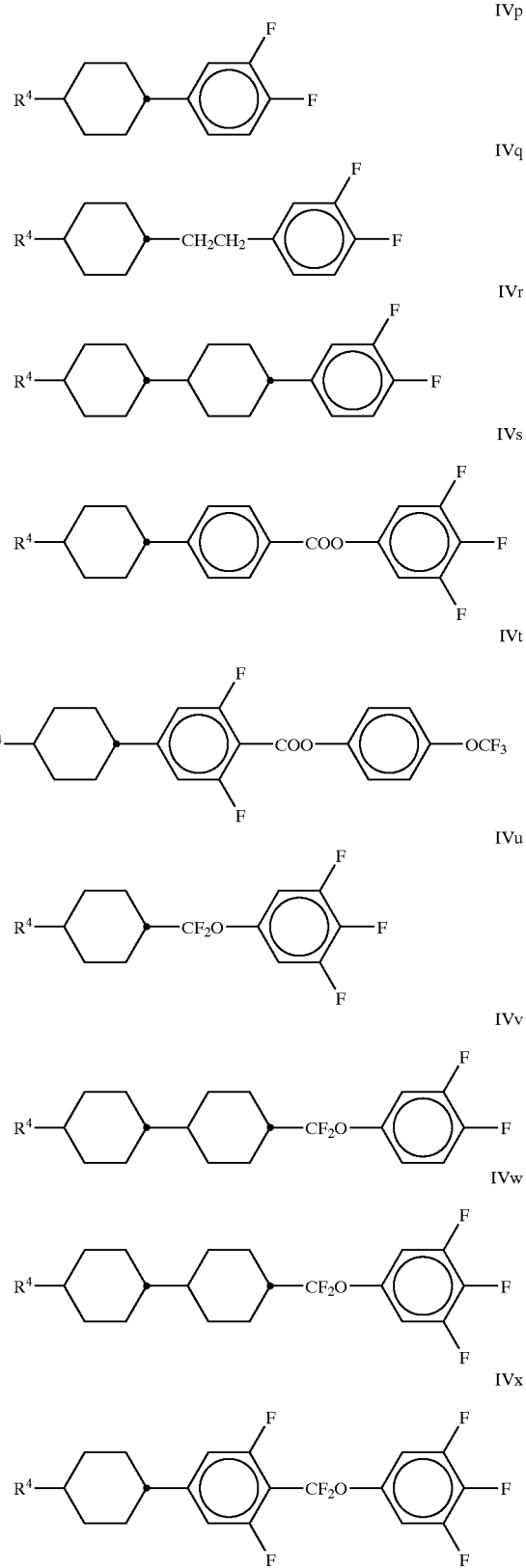

in which $R^4$ is as defined above under formula IV.

Preference is furthermore given to liquid-crystal displays in which the liquid-crystalline medium comprises one or more compounds) of the formula IV selected from the group consisting of the subformulae IVp to IVr and/or the group consisting of the subformulae IVs to IVx.

in which $R^4$ is as defined above under formula IV.

In another preferred embodiment, the liquid-crystal display cells contain liquid-crystalline media comprising one or more compounds of the subformula Ic, the concentration of each of these compounds being in the range from 0.1 to 20%, preferably from 1 to 16%, particularly preferably from 2 to 12%, very particularly preferably from 3 to 10%.

In a preferred embodiment of the invention, the liquid-crystal display cells contain liquid-crystalline media comprising one or more compounds of the formula If, the concentration of each of these compounds being from 0.1 to 18%, preferably from 1 to 14%, particularly preferably from 2 to 10%.

The following liquid-crystal displays are preferred embodiments:

the medium additionally comprises one or more compounds selected from the group of the formulae Va and Vb

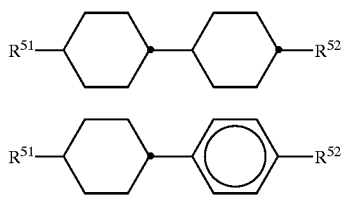

Va

Vb in which $R^{51}$ and $R^{52}$ are each, independently of one another, alkyl or alkoxy having 1 to 7 carbon atoms or alkenyl, alkenyloxy or alkoxyalkyl having 2 to 7 carbon atoms, $R^{51}$ preferably being alkyl having 1 to 5 carbon atoms, $R^{52}$ preferably being alkyl or alkoxy, in pariticlar alkoxy, having 1 to 3 carbon atoms, and/or one or more compounds selected from the group of the formulae Vc and Vd

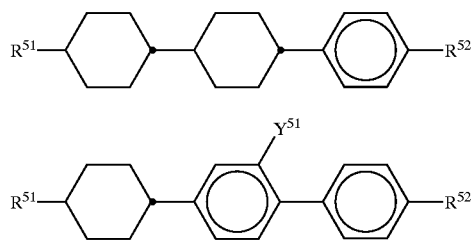

Vc

Vd in which
$R^{51}$ and $R^{52}$ independently of one another, are as defined above, $R^{51}$ preferably being n-alkyl having 3 to 5 carbon atoms, and $R^{52}$ preferably being n-alkyl, and
$Y^{51}$ is H or F;

the medium additionally comprises one or more compounds of the formula VIa

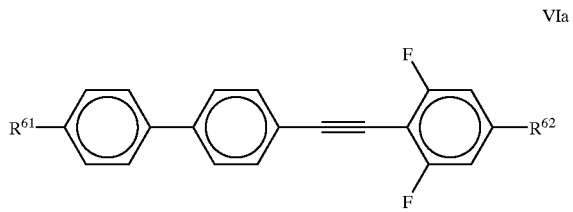

VIa in which
$R^{61}$ and $R^{62}$ are each, independently of one another, alkyl or alkoxy having 1 to 7 carbon atoms, preferably alkyl having 1 to 5 carbon atoms.

Preference is given to displays containing liquid-crystal mixtures comprising
one or more compounds of the formula Va
in which, preferably, at least one of the groups $R^{51}$ and $R^{52}$ is alkenyl, preferably 1E-alkenyl, particularly preferably vinyl or 1E-propenyl,
one or more compounds of the formula Vb
in which, preferably,
$R^{51}$ is n-alkyl having 3 to 5 carbon atoms, particularly preferably having 3 to 5 carbon atoms,
and
$R^{52}$ is alkoxy having 1 to 3 carbon atoms, particularly preferably having 1 carbon atom,
one or more compounds of the formula Vc
in which
$R^{51}$ is n-alkyl having 1 to 5 carbon atoms, preferably having 1 to 3 carbon atoms,
and
$R^{52}$ is 1E-alkenyl having 2 to 5 carbon atoms, preferably having 2 to 3 carbon atoms,
one or more compounds of the formula Vd
in which
$R^{51}$ is n-alkyl having 1 to 5 carbon atoms, preferably having 1 to 3 carbon atoms,
$R^{52}$ is n-alkyl having 1 to 5 carbon atoms, preferably having 2 to 4 carbon atoms,
and
$Y^{51}$ is preferably H.

Preference is furthermore given to a liquid-crystal display according to the invention in which the pixels are addressed by means of an active matrix.

The invention furthermore relates to a liquid-crystalline medium of positive dielectric anisotropy which comprises at least one compound of the formula I, and at least one compound selected from the group consisting of the compounds of the formulae IIa to IIf and IIIa to IIIc, and at least one compound selected from the group consisting of the compounds of the formulae IVa and IVo, in particular which comprises from 2 to 30, preferably from 3 to 20, % by weight of at least one compound of the formula I, from 5 to 25, preferably from 5 to 18, % by weight of at least one compound of the formula II, preferably selected from the group consisting of the compounds of the formulae IIa to IIf, from 5 to 40, preferably from 10 to 30, % by weight of at least one compound of the formula III, preferably selected from the group consisting of the compounds of the subformulae IIIa to IIIc, from 5 to 50, preferably from 20 to 40, % by weight of at least one compound of the formula IV, preferably selected from the group consisting of the compounds of the subformulae IVa to IVo.

The liquid-crystalline media used in accordance with the invention generally have a birefringence ($\Delta n$) of <0.12, preferably $\Delta n$ is in the range from 0.05 to 0.11, in particular in the range from 0.07 to 0.10, with clearing points of 70 to 90° C.

The flow viscosity (at 20° C.) of the mixtures used in accordance with the invention is generally less than 30 $mm^2 \cdot s^{-1}$, in particular from 15 to 25 $mm^2 \cdot s^{-1}$. The resistivity of the materials according to the invention at 20° C. is generally from $5 \times 10^{10}$ to $5 \times 10^{13}$ $\Omega \cdot cm$, particularly preferably from $5 \times 10^{11}$ to $5 \times 10^{12}$ $\Omega \cdot cm$. The rotational viscosity of the mixtures according to the invention at 20° C. is generally less than 130 mPa·s, in particular from 70 to 110 mPa·s.

The Fredericksz threshold voltages of the mixtures according to the present invention are low, preferably 1.7 V or less, more preferably 1.5 V or less, most preferably 1.3 V or less, and in particular 1.1 V or less.

Media used in accordance with the invention having clearing points of from 70 to 80° C. have rotational viscosities of 120 mPa·s or less, preferably of 110 mPa·s or less, particularly preferably from 70 mPa·s to 100 mPa·s, very particularly preferably from 40 mPa·s to 90 mPa·s. The clearing point of the media used in accordance with the invention is above 60° C., preferably above 70° C. and particularly preferably 80° C. or more. In particular, the clearing point is in the range from 60° C. to 80° C. The storage stability in test cells, determined as described below, is 1000 hours or more at −30° C., preferably 500 hours or more at −40° C., very particularly preferably 1000 hours or more at −40° C.

The media used in accordance with the invention consist of from 5 to 30 compounds, preferably from 6 to 20 compounds, particularly preferably from 7 to 16 compounds.

It has been found that even a relatively small proportion of compounds of the formula I mixed with conventional liquid-crystal materials, but in particular with one or more compounds selected from the group consisting of the compounds of the formulae IIa to IIf and/or from the group consisting of the compounds of the formulae IIIa to IIIf and IVa to IVo, results in a significant reduction in the threshold voltage, in favourable values for the rotational viscosity $\gamma_1$ and in fast response times, in particular broad nematic phases having low smectic-nematic transition temperatures being observed. The compounds of the formulae I to IV are colourless, stable and readily miscible with one another and with other liquid-crystal materials.

The term "alkyl" encompasses straight-chain and branched alkyl groups having 1–7 carbon atoms, in particular the straight-chain groups methyl, ethyl, propyl, butyl, pentyl, hexyl and heptyl. Groups having 2–5 carbon atoms are preferred, unless explicitly stated otherwise.

The term "alkenyl" encompasses straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of very particularly preferred alkenyl groups are vinyl, 1E-propenyl, 1E-butenyl, 1E-pentenyl, 1E-hexenyl, 1E-heptenyl, 3E-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are preferred, unless explicitly stated otherwise.

The term "fluoroalkyl" preferably encompasses straight-chain groups containing terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of fluorine are not excluded.

The term "alkoxyalkyl" preferably encompasses straight-chain radicals of the formula $C_nH_{2n+1}$—O—$(CH_2)_m$, in which n and m are each, independently of one another, from 1 to 6. m is preferably 1 and n is preferably from 1 to 4.

A suitable choice of the meanings of $R^1$ to $R^{52}$ allows the response times, the threshold voltage, the steepness of the transmission characteristic lines etc. to be modified as desired. For example, 1E-alkenyl radicals, 3E-alkenyl radicals, 2E-alkenyloxy radicals and the like generally result in shorter response times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally result in lower threshold voltages and smaller values of $k_{33}/k_{11}$ compared with alkyl and alkoxy radicals.

The optimum weight ratio of the compounds of the formulae I–IV depends substantially on the desired properties, on the choice of the components of the formulae I, II, III and/or IV, and on the choice of any other components which may be present. Suitable weight ratios within the range given above can easily be determined from case to case.

The total amount of compounds of the formulae I to IV in the mixtures used according to the invention is not critical. The mixtures preferably comprise 50–90% by weight of compounds of the formulae I to IV. The mixtures may also comprise one or more further components in order to optimize various properties. However, the observed effect, particularly on the threshold voltage, is generally greater the higher the total concentration of compounds of the formulae I to IV, in particular of the formula I.

In a particularly preferred embodiment, the media according to the invention comprise compounds of the formula IV in which X is $OCF_3$. A favourable synergistic effect with the compounds of the formulae I and II results in particularly advantageous properties.

In addition to one or more compounds of the formula I, the liquid-crystalline media according to the invention preferably comprise from 2 to 40, in particular from 4 to 30, compounds as further constituents. These media very particularly preferably comprise from 7 to 15 compounds in addition to one or more compounds of the formula I. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of media used according to the invention can be characterized by the formulae 1, 2, 3, 4 and 5:

| | |
|---|---|
| R'—L—E—R" | 1 |
| R'—L—COO—E—R" | 2 |
| R'—L—OOC—E—R" | 3 |
| R'—L—CH$_2$CH$_2$—E—R" | 4 |
| R'—L—C≡C—E—R" | 5 |

In the formulae 1, 2, 3, 4 and 5, L and E, which may be identical or different, are in each case, independently of one another, a bivalent radical from the group consisting of -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller subgroup of the compounds of the formulae 1, 2, 3, 4 and 5, R' and R" are each, independently of one another, alkyl, alkenyl, alkoxy, alkoxyalkyl, alkenyloxy or alkanoyloxy having up to 8 carbon atoms. This smaller subgroup is called Group A below, and the compounds are denoted by the subformulae 1a, 2a, 3a, 4a and 5a. In most of these compounds, R' and R" are different from one another, one of these radicals usually being alkyl, alkenyl, alkoxy or alkoxyalkyl.

In another smaller subgroup of the compounds of the formulae 1, 2, 3, 4 and 5 which is called Group B, R" is —F, —Cl, —NCS or —(O)$_i$CH$_{3-(k+l)}$F$_k$Cl$_l$, where i is 0 or 1, and k+l is 1, 2 or 3; the compounds in which R" has this meaning are denoted by the subformulae 1b, 2b, 3b, 4b and 5b. Particular preference is given to those compounds of the subformulae 1b, 2b, 3b, 4b and 5b in which R" is —F, —Cl, —NCS, —CF$_3$, —OCHF$_2$ or —OCF$_3$.

In the compounds of the subformulae 1b, 2b, 3b, 4b and 5b, R' is as defined for the compounds of the subformulae 1a–5a and is preferably alkyl, alkenyl, alkoxy or alkoxyalkyl.

In a further smaller subgroup of the compounds of the formulae 1, 2, 3, 4 and 5, R" is —CN; this subgroup is called Group C below, and the compounds of this subgroup are correspondingly described by subformulae 1c, 2c, 3c, 4c and 5c. In the compounds of the subformulae 1c, 2c, 3c, 4c and 5c, R' is as defined for the compounds of the subformulae 1a–5a and is preferably alkyl, alkoxy or alkenyl.

In addition to the preferred compounds from Groups A, B and C, other compounds of the formulae 1, 2, 3, 4 and 5 having other variants of the proposed substituents are also customary. All these substances can be obtained by methods which are known from the literature or analogously thereto.

In addition to the compounds of the formulae I to IV, the media used according to the invention preferably comprise one or more compounds selected from Group A and/or Group B and/or Group C. The proportions by weight of the compounds from these groups in the media according to the invention are preferably Group A: from 0 to 90%, preferably from 20 to 90%, in particular from 30 to 90%
Group B: from 0 to 80%, preferably from 10 to 80%, in particular from 10 to 65%
Group C: from 0 to 80%, preferably from 5 to 80%, in particular from 5 to 50%, the sum of the proportions by weight of the Group A and/or B and/or C compounds present in the particular media used according to the invention preferably being from 5% to 90% and in particular from 10% to 90%.

The media used according to the invention preferably comprise from 1 to 40%, particularly preferably from 5 to 30%, of compounds of the formula I. The media preferably comprise two or more compounds of the formula I.

The construction of the IPS displays according to the invention corresponds to the usual design of displays of this type, as described, for example, in WO 91/10936 or EP 0 588 568. The term "conventional design" is broadly drawn here and also covers all variations and modifications of the IPS display, in particular, for example, also matrix display elements based on poly-Si TFT or MIM.

However, an essential difference between the displays according to the invention and the conventional displays lies in the choice of the liquid-crystal parameters of the liquid-crystal layer.

The liquid-crystal mixtures which are used in accordance with the invention are prepared in a manner which is customary per se. In general, the desired amount of the components used in the smaller amount is dissolved in the components making up the principal constituent, advantageously at elevated temperature. It is also possible to prepare the mixtures in other conventional manners, for example by using pre-mixtures, for example mixtures of homologues, or using so-called "multi-bottle" systems which, for example, consist of four basic mixtures which differ significantly from one another in only one physical property in each case.

The dielectrics may also comprise further additives known to the person skilled in the art and described in the literature. For example, 0–15%, preferably 0–10%, of pleochroic dyes and/or chiral dopants can be added. The individual compounds added are employed in concentrations of from 0.01 to 6%, preferably from 0.1 to 3%. However, the concentrations of the other constituents of the liquid-crystal mixtures, i.e. the liquid-crystalline or mesogenic compounds, are given without taking into account the concentration of these additives.

Above and below,

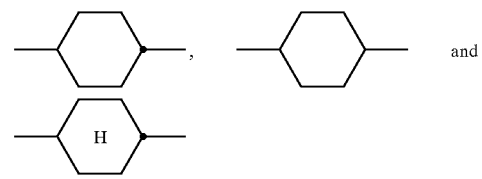

are trans-1,4-cyclohexylene.

The physical properties of the liquid-crystal mixtures are determined as described in "Physical Properties of Liquid Crystals", Ed. W. Becker, Merck KGaA, status November 1997, unless explicitly stated otherwise.

C denotes a crystalline phase, S a smectic phase, $S_C$ a smectic C phase, $S_A$ a smectic A phase, N a nematic phase and I the isotropic phase. $V_0$ denotes the capacitive threshold voltage. Δn denotes the optical anisotropy and $n_0$ the ordinary refractive index (in each case at 589 nm). Δ∈ denotes the dielectric anisotropy (Δ∈=∈$_\parallel$–∈$_\perp$, where ∈$_\parallel$ denotes the dielectric constant parallel to the longitudinal molecular axes and ∈$_\perp$ denotes the dielectric constant perpendicular thereto, in each case at 1 kHz). The electro-optical data were measured in a planar cell at 20° C., unless expressly stated otherwise. All physical properties are quoted and measured at 20° C., unless expressly stated otherwise. The cells are preferably bright in the "off" state.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications, cited above and of corresponding German Patent application No. 100 19 061.8, filed Apr. 18, 2001, are hereby incorporated by reference.

The following examples are intended to illustrate the invention without limiting it. Above and below, percentages are percent by weight. All temperatures are given in degrees Celsius. Δn denotes the optical anisotropy (589 nm, 20° C.), Δ∈ denotes the dielectric anisotropy (1 kHz, 20° C.), H.R. denotes the voltage holding ratio (at 100° C., after 5 minutes in an oven at 1 V), and $V_0$, the capacitive threshold voltage, was determined at 20° C. and 1 kHz.

The calibrated rotational viscometer gave a rotational viscosity for ZLI-4792 (Merck KGaA) of 133 mPa·s at 20° C.

The storage stability was investigated in sealed test cells with an optical retardation of about 0.5 μm using CU-1511 from DuPont, USA, as alignment layer. To this end, in each case 5 test cells were adhesively bonded on both sides to crossed polarizers and stored at fixed temperatures of 0° C., −10° C., −20° C., −30° C. or −40° C. The cells were assessed visually for changes at intervals of 24 hours in each case. The storage time at the respective temperature $t_{store}$ (T) was noted as the final time at which no change was observed in any of the cells.

In the present application and in the following examples, the structures of the liquid-crystal compounds are specified by acronyms, which can be transformed into chemical formulae according to the following Tables A and B. All radicals $C_nH_{2n+1}$ are straight-chain alkyl radicals having n or m carbon atoms. The coding according to Table B is self-evident. Table A specifies the acronym for the parent body only. In individual cases, the acronym for the parent body is followed, separated therefrom by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nCl | $C_nH_{2n+1}$ | Cl | H | H |
| nCl.F | $C_nH_{2n+1}$ | Cl | F | H |
| nCl.F.F | $C_nH_{2n+1}$ | Cl | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | C≡C—$C_mH_{2m+1}$ | H | H |
| nCF$_3$.F.F | $C_nH_{2n+1}$ | CF$_3$ | F | F |
| nOCF$_3$.F | $C_nH_{2n+1}$ | OCF$_3$ | F | H |
| nOCF$_3$.F.F | $C_nH_{2n+1}$ | OCF$_3$ | F | F |
| nOCF$_2$.F.F | $C_nH_{2n+1}$ | OCHF$_2$ | F | F |

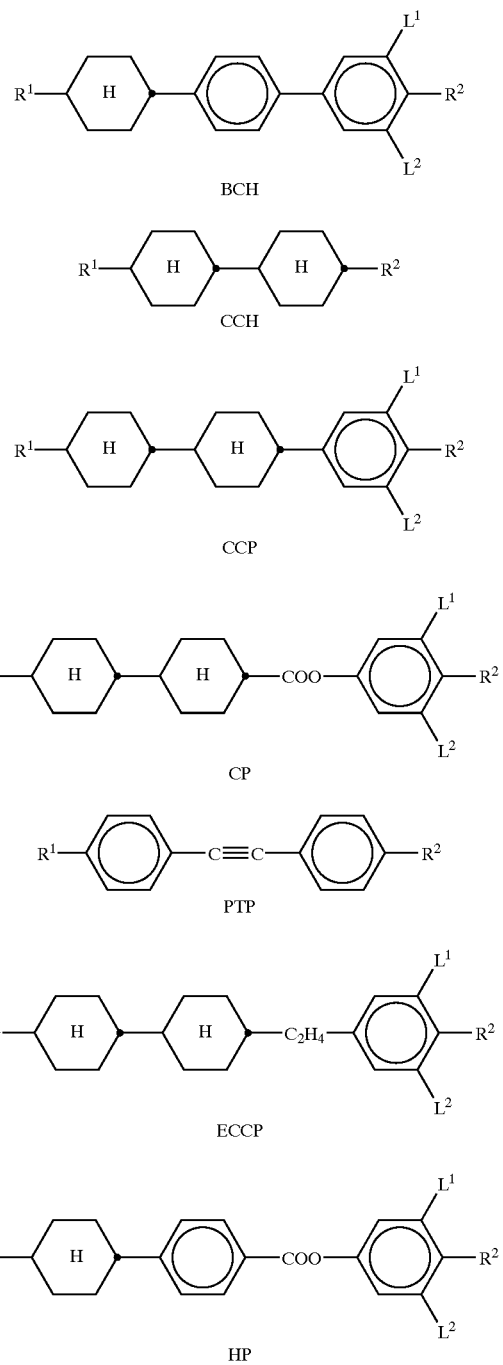

TABLE A

BCH

CCH

CCP

CP

PTP

ECCP

HP

TABLE A-continued
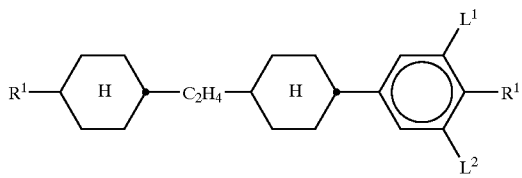
CECP
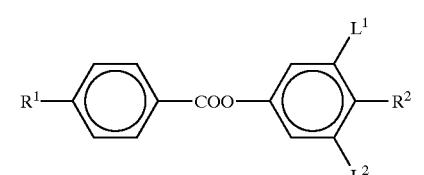
ME
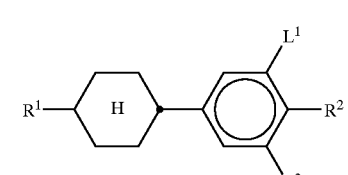
PCH
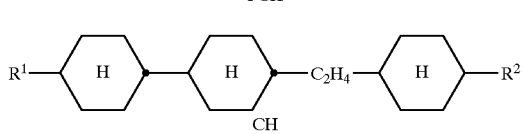
CH
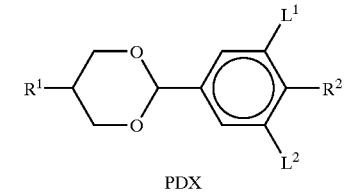
PDX
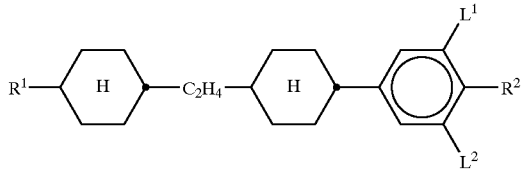
BECH
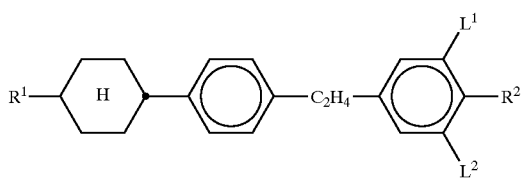
EBCH
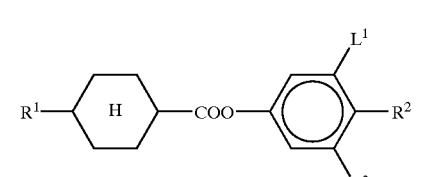
D
TABLE B
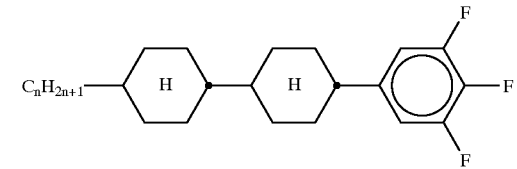
CCP-nF.F.F
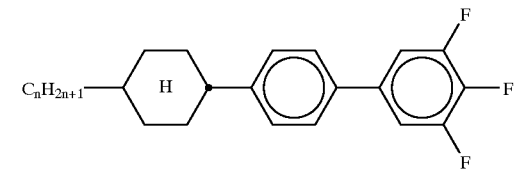
BCH-nF.F.F
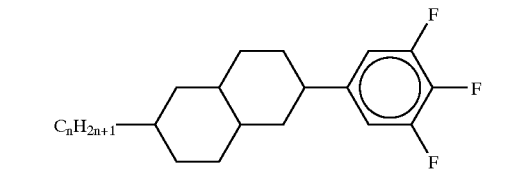
DHP-nF.F.F
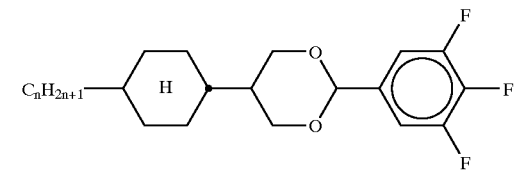
CDU-n-F
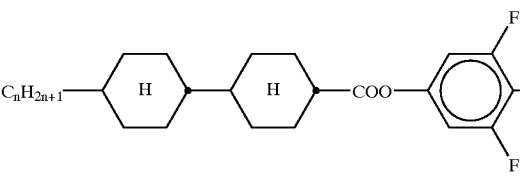
CCZU-n-F
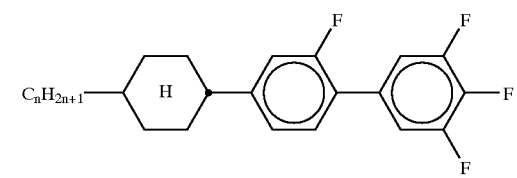
CGU-n-F
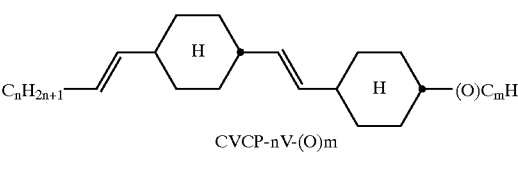
CVCP-nV-(O)m
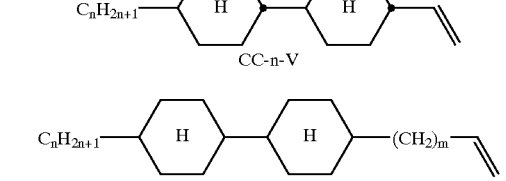
CC-n-V
CC-n-mV

TABLE B-continued

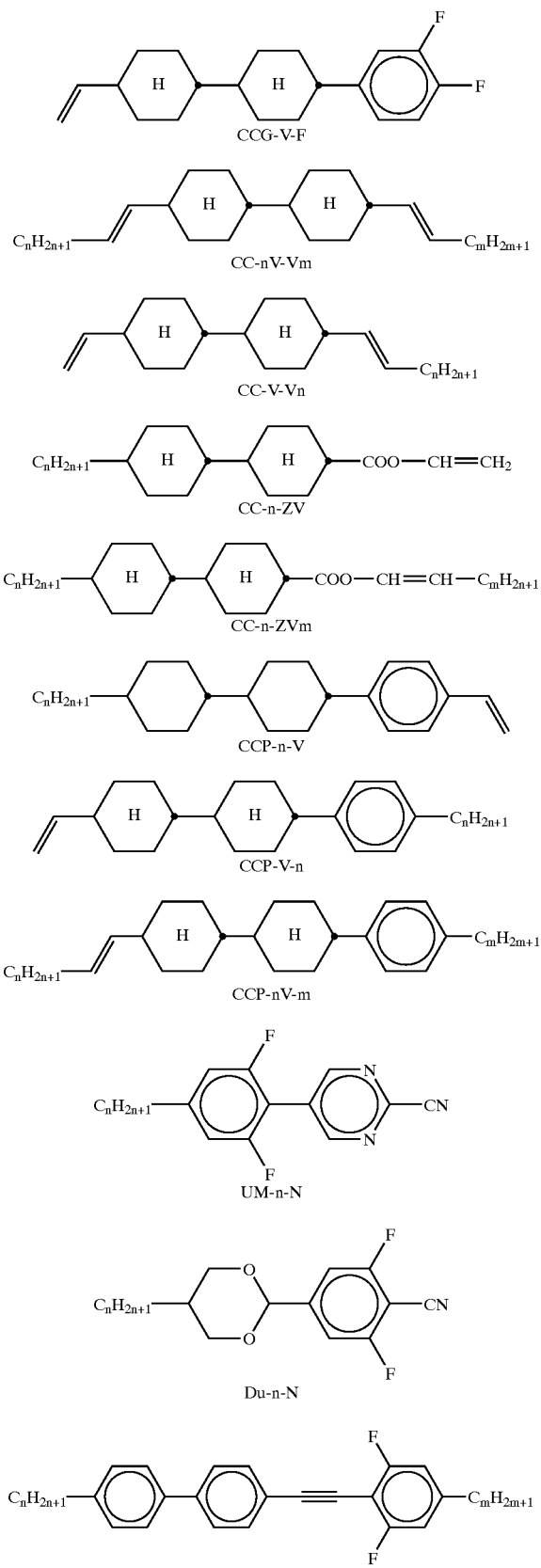

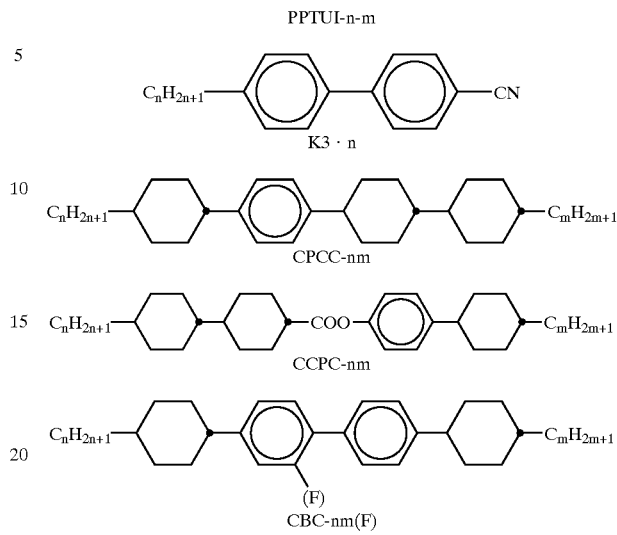

Preferred displays contain media comprising, in particular, one or more compounds from Tables A and B in addition to the compounds of the formula I.

Particularly preferred IPS displays contain media comprising

- one or more compounds of one of the formulae in Table A and one or more compounds of the formulae in Table B
- one or more compounds of each of two or more different types of compounds of the formulae in Table A
- one or more compounds of each of two or more different types of compounds of the formulae in Table B
- one or more compounds of each of four or more compounds from the group consisting of the compounds of the formulae in Tables A and B.

The examples below are intended to illustrate the invention without restricting its scope in any way. However, the examples show typical mixture concepts and the physical parameters and parameter combinations achievable therewith.

EXAMPLE 1

An IPS display contains a nematic mixture having

| Compound Abbreviation | Conc./% | Physical properties |
|---|---|---|
| GZU-3-N | 7.0 | T(N, I) = 72.0° C. |
| PCH-3 | 6.0 | T(S, N) < −20° C. |
| PDX-3 | 7.0 | $n_e$ (589 nm, 20° C.) = 1.5743 |
| CCZU-2-F | 7.0 | Δn (589 nm, 20° C.) = 0.0912 |
| CCZU-3-F | 15.0 | $\epsilon_\perp$ (1 kHz, 20° C.) = 4.6 |
| CCZU-5-F | 7.0 | Δε (1 kHz, 20° C.) = 10.5 |
| CCP-V-1 | 12.0 | $k_1$ (20° C.) = 14.7 pN |
| BCH-32 | 5.0 | $k_3/k_1$ (20° C.) = 1.48 |
| CC-5-V | 20.0 | $\gamma_1$ (20° C.) = 95 mPa.s |
| PCH-302 | 14.0 | |
| Σ | 100.0 | $V_0$ (1 kHz, 20° C.) = 1.03 V | and has good contrast.

EXAMPLE 2

An IPS display contains a nematic mixture having

| Compound Abbreviation | Conc./% | Physical properties |
|---|---|---|
| UZU-3-N | 7.0 | T(N, I) = 72.0° C. |
| PCH-3 | 6.0 | T(S, N) < −20° C. |
| PDX-3 | 7.0 | $n_e$ (589 nm, 20° C.) = 1.5746 |
| CCZU-2-F | 7.0 | $\Delta n$ (589 nm, 20° C.) = 0.0901 |
| CCZU-3-F | 15.0 | $\epsilon_\perp$ (1 kHz, 20° C.) = 4.8 |
| CCZU-5-F | 7.0 | $\Delta\epsilon$ (1 kHz, 20° C.) = 11.0 |
| CCP-V-1 | 13.0 | $k_1$ (20° C.) = 15.1 pN |
| BCH-32 | 7.0 | $k_3/k_1$ (20° C.) = 1.53 |
| CC-5-V | 20.0 | $\gamma_1$ (20° C.) = 91 mPa.s |
| PCH-302 | 11.0 | |
| Σ | 100.0 | $V_0$ (1 kHz, 20° C.) = 1.00 V | and has good contrast.

COMPARATIVE EXAMPLE

An IPS display contains a nematic mixture having

| Compound Abbreviation | Conc./% | Physical properties |
|---|---|---|
| ME2N. F | 3.0 | T(N, I) = 73.5° C. |
| ME3N. F | 6.0 | T(S, N) < −20° C. |
| PCH-3 | 5.0 | $n_e$ (589 nm, 20° C.) = 1.5756 |
| PDX-3 | 7.0 | $\Delta n$ (589 nm, 20° C.) = 0.0906 |
| CCZU-2-F | 7.0 | $\epsilon_\perp$ (1 kHz, 20° C.) = 4.6 |
| CCZU-3-F | 15.0 | $\Delta\epsilon$ (1 kHz, 20° C.) = 11.0 |
| CCZU-5-F | 7.0 | $k_1$ (20° C.) = 10.3 pN |
| CCP-V-1 | 16.0 | $k_3/k_1$ (20° C.) = 1.52 |
| BCH-32 | 2.0 | $\gamma_1$ (20° C.) = 96 mPa.s |
| CC-5-V | 20.0 | |
| PCH-302 | 12.0 | $V_0$ (1 kHz, 20° C.) = 1.06 V |
| Σ | 100.0 | | and has at best adequate contrast.

Directly compared to the liquid-crystal mixtures of Examples 1 and 2, which were adjusted to virtually the same application parameters, in particular clearing point and optical anisotropy, the Comparative Example has both a higher threshold and a higher rotational viscosity.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An electro-optical liquid-crystal display comprising a realignment layer, for realigning liquid crystals, and a liquid-crystalline medium of positive dielectric anisotropy, wherein said medium comprises one or more compounds of formula I

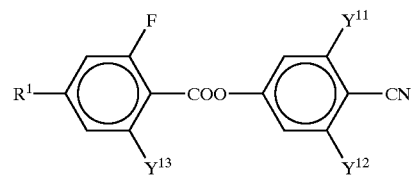

wherein $R^1$ is H, alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms, and $Y^{11}$, $Y^{12}$ and $Y^{13}$ are each, independently of one another, H or F; and at least one compound according to formula IVf

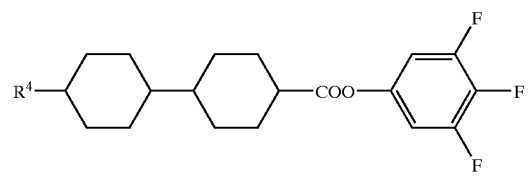

wherein $R^1$ is is alkyl having 1 to 7 carbon atoms, alkoxy having 1 to 7 carbon atoms, alkenyl having 2 to 7 carbon atoms, alkenyloxy having 2 to 7 carbon atoms, or alkoxyalkyl having 2 to 7 carbon atoms.

2. A liquid-crystal display according to claim 1, wherein said medium additionally comprises one or more compounds of formula U:

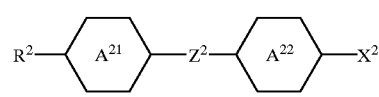

wherein $R^2$ is alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms,

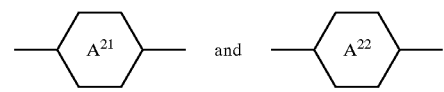

are each, independently of one another,

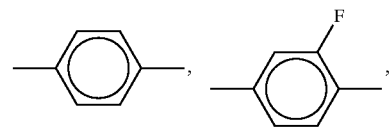

-continued

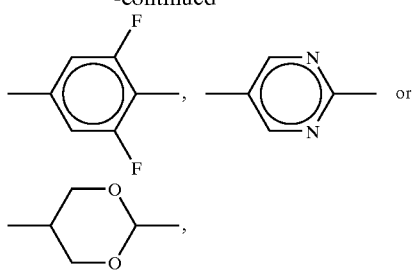

and
at least one of

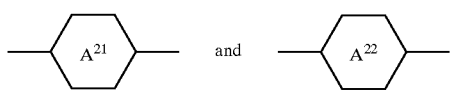

is

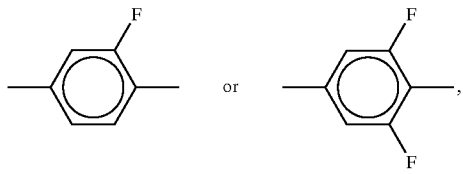

$X^2$ is F, Cl or CN; and
$Z^2$ is —CH$_2$CH$_2$—, —COO—, —CF$_2$O— or a single bond.

3. A liquid-crystal display according claim 1, wherein said medium comprises at least one compound of formula III

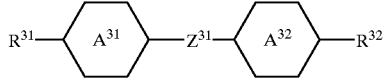

III wherein $R^{31}$ and $R^{32}$ are each, independently of one another, alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms,

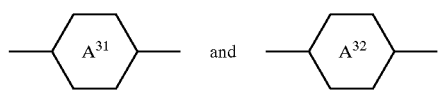

are each, independently of one another,

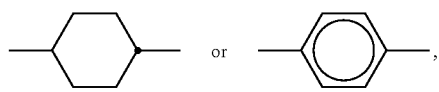

and
$Z^{31}$ is —CH=CH—, —COO—, —CH$_2$CH$_2$- or a single bond.

4. A liquid-crystal display according claim 2, wherein said medium comprises at least one compound of formula III

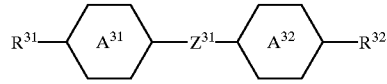

III wherein $R^{31}$ and $R^{32}$ are each, independently of one another, alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms,

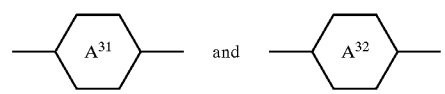

are each, independently of one another,

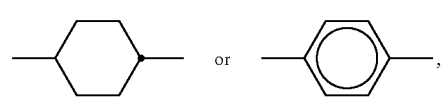

and
$Z^{31}$ is —CH=CH—, —COO—, —CH$_2$CH$_2$- or a single bond.

5. A liquid-crystal display according claim 1, wherein said medium comprises at least one compound of formula IV

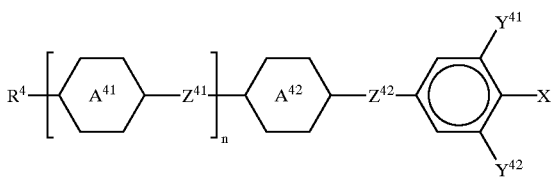

IV wherein $R^4$ is alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms,

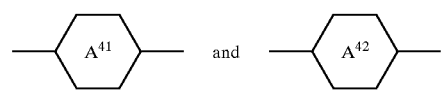

are each, independently of one another,

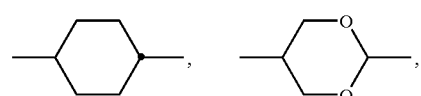

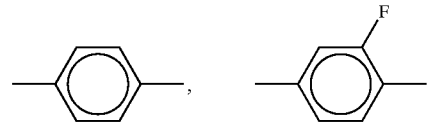

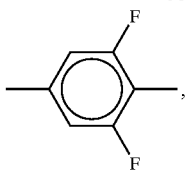

$Z^{41}$ and $Z^{42}$ are each, independently of one another, —CF$_2$O—, —COO—, —CH$_2$CH$_2$- or a single bond, n is 0 or 1, X is OCF$_3$, OCF$_2$H or F, and $Y^{41}$ and $Y^{42}$ are each, independently of one another, H or F.

6. A liquid-crystal display according claim 2, wherein said medium additionally comprises at least one compound of formula IV

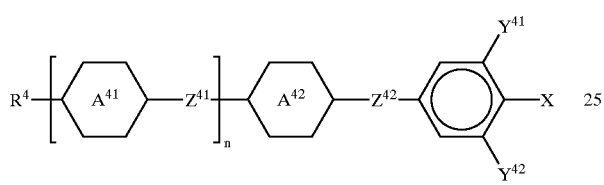

wherein

R$^4$ is alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms,

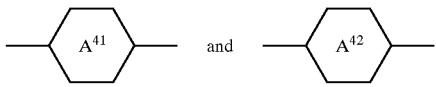

are each, independently of one another,

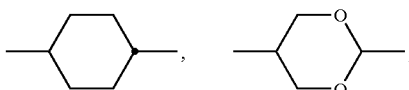

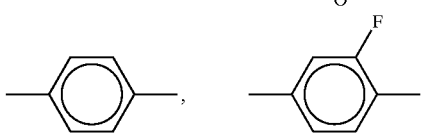

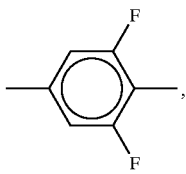

$Z^{41}$ and $Z^{42}$ are each, independently of one another, —CF$_2$O—, —COO—, —CH$_2$CH$_2$- or a single bond, n is 0 or 1, X is OCF$_3$, OCF$_2$H or F, and $Y^{41}$ and $Y^{42}$ are each, independently of one another, H or F.

7. A liquid-crystal display according claim 3, wherein said medium comprises at least one compound of formula IV

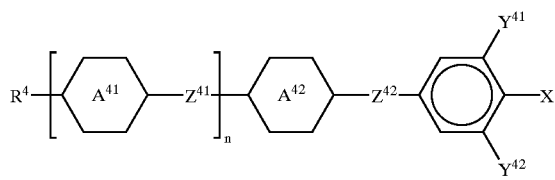

wherein

R$^4$ is alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms,

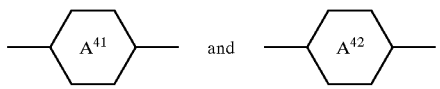

are each, independently of one another,

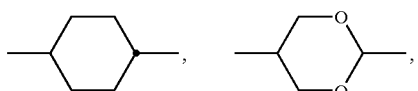

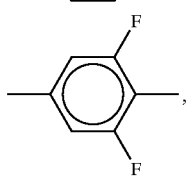

$Z^{41}$ and $Z^{42}$ are each, independently of one another, —CF$_2$O—, —COO—, —CH$_2$CH$_2$- or a single bond, n is 0 or 1, X is OCF$_3$, OCF$_2$H or F, and $Y^{41}$ and $Y^{42}$ are each, independently of one another, H or F.

8. A liquid-crystal display according claim 4, wherein said medium comprises at least one compound of formula IV

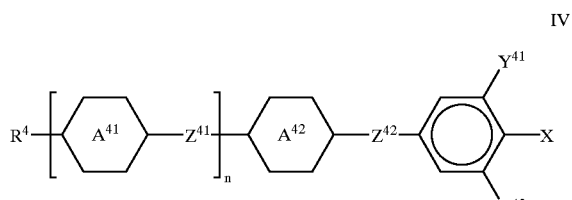

wherein

R$^4$ is alkyl having 1 to 7 carbon atoms, alkoxy having 1 to 7 carbon atoms, alkenyl having 2 to 7 carbon atoms, alkenyloxy having 2 to 7 carbon atoms or alkoxyalkyl having 2 to 7 carbon atoms,

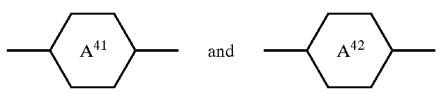

are each, independently of one another,

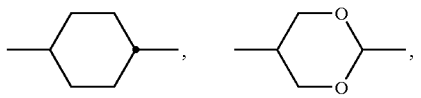

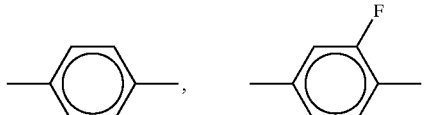

or

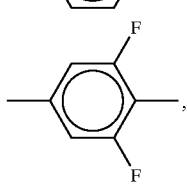

$Z^{41}$ and $Z^{42}$ are each, independently of one another, —CF$_2$O—, —COO—, —CH$_2$CH$_2$- or a single bond, n is 0 or 1, X is OCF$_3$, QCF$_2$H or F, and $Y^{41}$ and $Y^{42}$ are each, independently of one another, H or F.

9. A liquid-crystal display according to claim 2, wherein medium comprises one or more compounds of formulae IIa to IIg

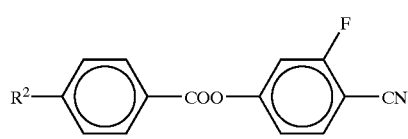   IIa

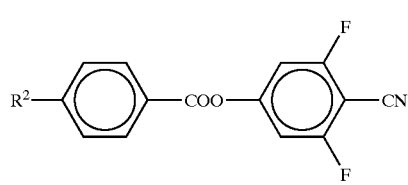   IIb

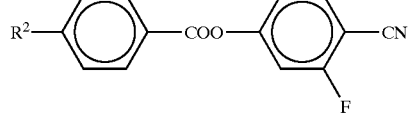   IIc

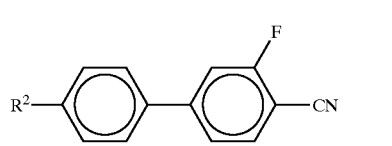   IId

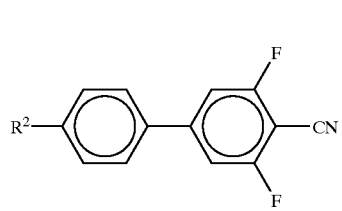

10. A liquid-crystal display according to claim 4, wherein medium comprises one or more compounds of formulae IIa to IIg

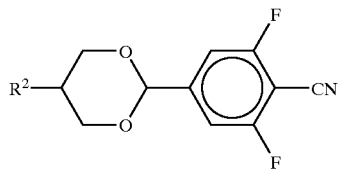   IIa

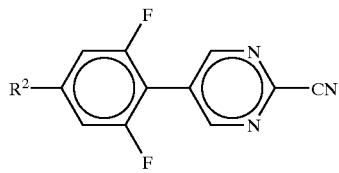   IIb

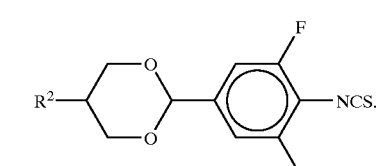   IIc

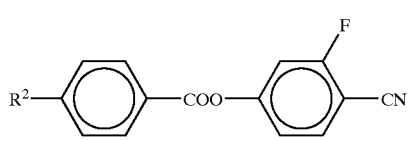   IId

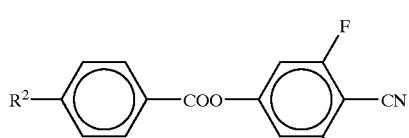   IIe

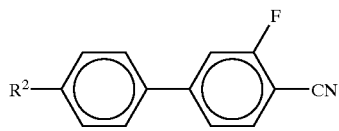   IIf

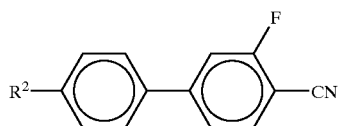   IIg

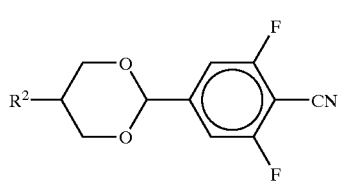

IIf

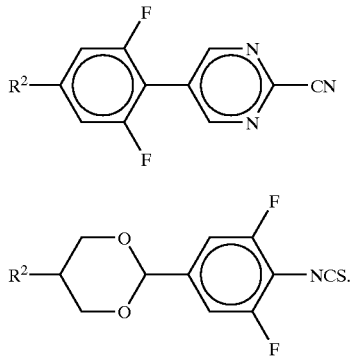

IIg

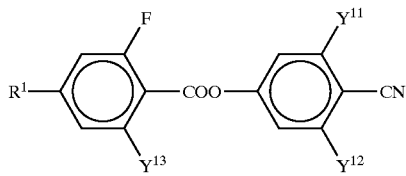

11. A liquid-crystal display according claim 3, wherein said medium comprises one or more compounds of formulae IIIa to IIIc IIIa
IIIb
IIIc

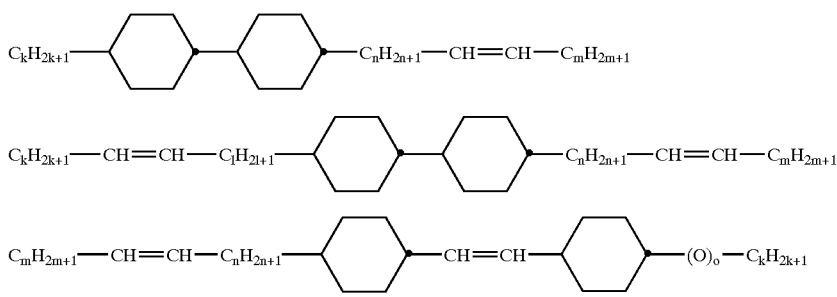

wherein
k is 1, 2, 3, 4 or 5,
m and n are each 0, 1, 2 or 3,
m+n is $\leq 5$, and
o is 0 or 1.

12. A liquid-crystal display according to claim 8, wherein said medium comprises
1 to 35% of one or more compounds of the formula I,
3 to 30% of one or more compounds of the formula II,
3 to 45% of one or more compounds of the formula III, and
5 to 60% by weight of at least one compound of the formula IV.

13. A liquid-crystal display according to claim 1, wherein pixels of the display are addressed by means of an active matrix.

14. A liquid-crystalline medium of positive dielectric anisotropy comprising at least two liquid-crystal compounds wherein at least one of said compounds is of formula I

I

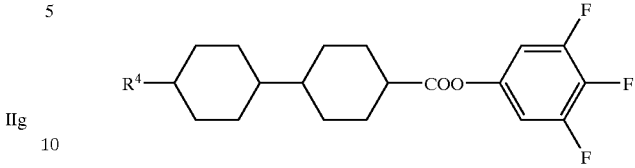

wherein
$R^1$ is alkenyl having 2 to 7 carbon atoms, alkenyloxy having 2 to 7 carbon atoms or alkoxyalkyl having 2 to 7 carbon atoms, $Y^{11}$ and $Y^{12}$ are each F, and
$Y^{13}$ is H, and
at least one of said compounds is of formula IVf IVf

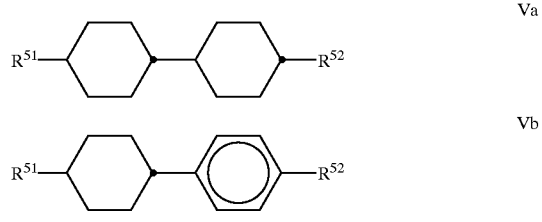

wherein
$R^4$ is is alkyl having 1 to 7 carbon atoms, alkoxy having 1 to 7 carbon atoms, alkenyl having 2 to 7 carbon atoms, alkenyloxy having 2 to 7 carbon atoms, or alkoxyalkyl having 2 to 7 carbon atoms.

15. In a method of generating an electro-optical effect using a liquid-crystal display, the improvement wherein a display according to claim 1 is used to generate said effect.

16. A liquid-crystal display according to claim 1, wherein said medium additionally comprises one or more compounds of formulae Va and Vb Va Vb in which $R^{51}$ and $R^{52}$ are each, independently of one another, alkyl or alkoxy having 1 to 7 carbon atoms or alkenyl, alkenyloxy or alkoxyalkyl having 2 to 7 carbon atoms, and/or one or more compounds of formulae Vc and Vd Vc

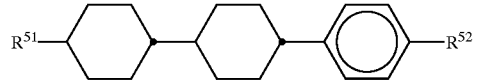

-continued

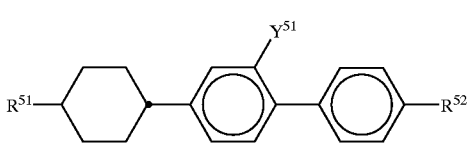

Vd in which
R$^{51}$ and R$^{52}$ independently of one another, are as defined above, and
Y$^{51}$ is H or F.

17. A liquid-crystal display according to claim 8, wherein said medium comprises
2 to 30% of one or more compounds of the formula I,
5 to 25% of one or more compounds of the formula II,
5 to 40% of one or more compounds of the formula III, and
5 to 50% by weight of at least one compound of the formula IV.

18. A liquid crystal display according to claim 1, wherein said medium has a birefringence of <0.12, a flow viscosity at 20° of <30 mm$^2$·s$^{-1}$, a resistivity at 20° C. of $5\times10^{10}$ to $5\times10^{13}$ Ω·cm, a rotational viscosity at 20° C. of <130 mPa·s, and a clearing point above 60° C.

19. A liquid-crystal display according to claim 1, wherein said medium has a birefringence of 0.05–0.11.

20. A liquid-crystal display according to claim 1, wherein said medium has a flow viscosity at 20° C. of 15–25 mm$^2$·s$^{-1}$.

21. A liquid-crystal display according to claim 1, wherein said medium has a resistivity at 20° C. of $5\times10^{11}$ to $5\times10^{12}$ Ω·cm.

22. A liquid-crystal display according to claim 1, wherein said medium has a rotational viscosity at 20° C. of 70–110 mPa·s.

23. A liquid-crystal display according to claim 1, wherein said medium exhibits a storage stability of at least 1000 hours at −30° C.

24. A display according to claim 1, wherein in formula I R$^1$ is 1E-alkenyl, 1E-alkenyloxy, or straight-chain alkoxyalkyl.

25. A display according to claim 24, wherein in formula I R$^1$ has 2 to 5 carbon atoms.

26. A liquid-crystal medium according to claim 14, wherein in formula I R$^1$ is 1E-alkenyl, 1E-alkenyloxy, or straight-chain alkoxyalkyl.

27. A liquid-crystal medium according to claim 26, wherein in formula I R$^1$ has 2 to 5 carbon atoms.

28. A display according to claim 1, wherein the concentration in said medium of each compound of formula I is 0.1 to 20%.

29. A display according to claim 28, wherein the concentration in said medium of each compound of formula I is 1 to 16%.

30. A display according to claim 29, wherein the concentration in said medium of each compound of formula I is 3 to 10%.

31. A medium according to claim 14, wherein the concentration in said medium of each compound of formula I is 0.1 to 20%.

32. A medium according to claim 31, wherein the concentration in said medium of each compound of formula I is 1 to 16%.

33. A medium according to claim 31, wherein the concentration in said medium of each compound of formula I is 3 to 10%.

34. A display according to claim 8, wherein said medium contains 2 to 30% by weight of at least one compound of formula I, 5 to 25% by weight of at least one compound of formula II, 5 to 40% by weight of at least one compound of formula III, and 5 to 50% by weight of at least one compound of the formula IV.

35. A display according to claim 8, wherein said medium contains 3 to 20% by weight of at least one compound of formula I, 5 to 18% by weight of at least one compound of formula II, 10 to 30% by weight of at least one compound of formula III, and 20 to 40% by weight of at least one compound of the formula IV.

36. An electro-optical liquid-crystal display comprising a realignment layer, for realigning liquid crystals, and a liquid-crystalline medium of positive dielectric anisotropy, wherein said medium comprises one or more compounds of formula I

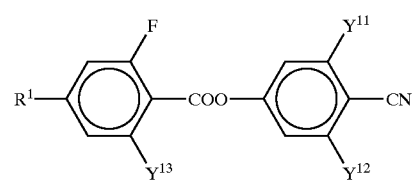

I wherein
R$^1$ is alkenyl having 2 to 7 carbon atoms or alkenyloxy having 2 to 7 carbon atoms, and
Y$^{11}$, Y$^{12}$ and Y$^{13}$ are each, independently of one another, H or F; and at least one compound according to formula IVf

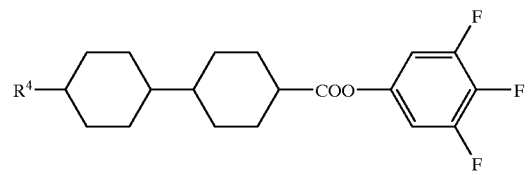

wherein
R$^4$ is is alkyl having 1 to 7 carbon atoms, alkoxy having 1 to 7 carbon atoms, alkenyl having 2 to 7 carbon atoms, alkenyloxy having 2 to 7 carbon atoms, or alkoxyalkyl having 2 to 7 carbon atoms; and
wherein when an electric voltage is applied to said display an electric field is generated which has a component parallel to the liquid-crystal layer for realignment of the liquid crystals.

37. A liquid-crystalline medium of positive dielectric anisotropy comprising at least two liquid-crystal compounds wherein at least one of said compounds is of formula I

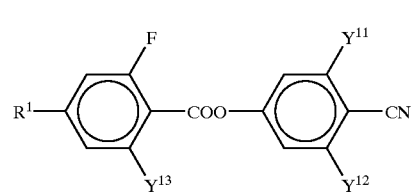

I wherein
R$^1$ is alkenyl having 2 to 7 carbon atoms or alkenyloxy having 2 to 7 carbon atoms, and $Y^{11}$, $Y^{12}$ and $Y^{13}$ are each, independently of one another, H or F, and at least one of said compounds is of formula IVf

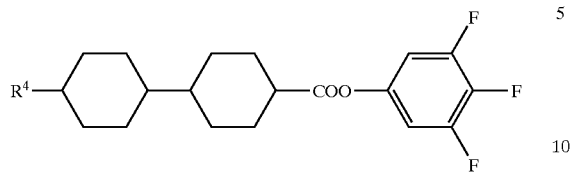

wherein $R^4$ is is alkyl having 1 to 7 carbon atoms, alkoxy having 1 to 7 carbon atoms, alkenyl having 2 to 7 carbon atoms, alkenyloxy having 2 to 7 carbon atoms, or alkoxyalkyl having 2 to 7 carbon atoms.

38. A liquid-crystal display according to claim 1, wherein $R^1$ is alkenyl having 2 to 7 carbon atoms, alkenyloxy having 2 to 7 carbon atoms or alkoxyalkyl having 2 to 7 carbon atoms, $Y^{11}$ and $Y^{12}$ are each F, and $Y^{13}$ is H, and wherein when an electric voltage is applied to said display an electric field is generated which has a component parallel to the liquid-crystal layer for realignment of the liquid crystals.

* * * * *

UNITED STATES PATENT AND TRADEMARK OFFICE
CERTIFICATE OF CORRECTION

PATENT NO.  : 6,761,938 B2
DATED       : July 13, 2004
INVENTOR(S) : Heckmeier et al.

It is certified that error appears in the above-identified patent and that said Letters Patent is hereby corrected as shown below:

Title page,
Item [74], *Attorney, Agent, or Firm*, reads "Branogan" should read -- Branigan --

Column 24,
Line 32, reads "$R^1$" should read -- $R^4$ --
Line 32, reads "is is" should read -- is --
Line 38, reads "U" should read -- II --

Signed and Sealed this

Thirtieth Day of November, 2004

JON W. DUDAS
*Director of the United States Patent and Trademark Office*